(12) United States Patent
Rana et al.

(10) Patent No.: US 12,336,652 B2
(45) Date of Patent: Jun. 24, 2025

(54) MACHINE FOR COOKING A DOSE OF PASTA IN A CONTAINER

(71) Applicant: PASTIFICIO RANA S.P.A., San Giovanni Lupatoto (IT)

(72) Inventors: Gian Luca Rana, San Giovanni Lupatoto (IT); Alberto Luigi Cologni, Osio Sopra (IT); Mattia De Santis, Paullo (IT)

(73) Assignee: PASTIFICIO RANA S.P.A. (IT)

(*) Notice: Subject to any disclaimer, the term of this patent is extended or adjusted under 35 U.S.C. 154(b) by 820 days.

(21) Appl. No.: 17/603,967

(22) PCT Filed: Apr. 16, 2020

(86) PCT No.: PCT/IB2020/053610
§ 371 (c)(1),
(2) Date: Oct. 15, 2021

(87) PCT Pub. No.: WO2020/212904
PCT Pub. Date: Oct. 22, 2020

(65) Prior Publication Data
US 2022/0192408 A1    Jun. 23, 2022

(30) Foreign Application Priority Data

Apr. 16, 2019  (IT) ........................ 102019000005918

(51) Int. Cl.
*A47J 27/04*  (2006.01)
*A47J 27/00*  (2006.01)

(52) U.S. Cl.
CPC .......... *A47J 27/04* (2013.01); *A47J 2027/006* (2013.01); *A47J 2027/043* (2013.01)

(58) Field of Classification Search
CPC . A47J 27/04; A47J 2027/006; A47J 2027/043
(Continued)

(56) References Cited

U.S. PATENT DOCUMENTS 4,635,812 A * 1/1987 Mueller ................. A47J 27/16
                                                        99/410
2010/0151092 A1  6/2010 Sus et al.
(Continued)

FOREIGN PATENT DOCUMENTS

EP    2281493 A1    2/2011
JP    2003070644 A *  3/2003  ............. A47J 39/00
(Continued)

OTHER PUBLICATIONS

Machine Translation of JP-2003070644-A (Year: 2024).*
(Continued)

*Primary Examiner* — Steven W Crabb
*Assistant Examiner* — Thomas J Ward
(74) *Attorney, Agent, or Firm* — The Belles Group, P.C.

(57) ABSTRACT

A machine for cooking a dose of pasta in a container has: a frame comprising an upper structure and a lower structure facing the upper structure; a dispenser, which comprises at least a first opening for delivering steam and at least a second opening for delivering hot water, is supported by the upper structure, and extends from the upper structure towards the lower structure in the space between the upper structure and the lower structure along a longitudinal axis; a reference element, which is supported by the lower structure and is configured to place the container with the top opening in correspondence of the dispenser.

16 Claims, 4 Drawing Sheets

(58) Field of Classification Search
USPC .................... 99/359, 483; 126/369; 426/392
See application file for complete search history.

(56) References Cited

U.S. PATENT DOCUMENTS

| | | | |
|---|---|---|---|
| 2010/0178401 A1* | 7/2010 | Van Appeldoorn ... | B65B 31/028 |
| | | | 53/471 |
| 2011/0256287 A1* | 10/2011 | Sus .................... | A47J 31/4489 |
| | | | 99/473 |
| 2013/0280394 A1* | 10/2013 | Ewald .................... | A47J 39/00 |
| | | | 126/369 |
| 2018/0199748 A1 | 7/2018 | Patel et al. | |
| 2021/0228014 A1 | 7/2021 | Rana | |

FOREIGN PATENT DOCUMENTS

| | | |
|---|---|---|
| JP | 2006304067 A | 11/2006 |
| JP | 2007031443 A | 2/2007 |
| WO | 0152669 A1 | 7/2001 |
| WO | WO2018/044160 | 3/2018 |
| WO | 2019207509 A1 | 10/2019 |

OTHER PUBLICATIONS

Office Action issued in corresponding Japanese Patent Application No. 2021-561785.
International Search Report and Written Opinion issued in PCT International Application No. PCT/IB2020/053610, mailed Jun. 5, 2020, pp. 1-12.
Office Action issued in corresponding European Patent Application No. 20725920.1 on Nov. 17, 2023.

* cited by examiner

MACHINE FOR COOKING A DOSE OF PASTA IN A CONTAINER

CROSS-REFERENCE TO RELATED APPLICATIONS

This Patent Application is a U.S. national stage application under 35 U.S.C. § 371 of PCT Application No. PCT/IB2020/053610, filed on Apr. 16, 2020, which claims priority from Italian Patent Application No. 102019000005918 filed on Apr. 16, 2019, the entire disclosure of the aforementioned priority applications are incorporated herein by reference in their entireties.

TECHNICAL FIELD

The present invention relates to a machine for cooking a dose of pasta.

In particular, the present invention relates to a machine configured to cook a dose of pasta in a container. The machine is configured to be used both in the food service field, for example in a restaurant or in a bar, and at home, without because of this loosing in generality.

PRIOR ART

Generally, machines to cook a dose of pasta comprise a steam generator and a nozzle to feed steam into a container containing the dose of pasta.

In particular, document US 2010/0151092 discloses an apparatus for cooking food in a container comprising a steam generator and a wand having a nozzle to supply steam.

Documents WO 2018/044160 and US 2018/199748 teach how to cook food inside a container by introducing steam into a container.

Currently known cooking machines are not capable of cooking a dose of pasta in the short amounts of time required by the quick-service food field and, at the same time, of preserving the organoleptic qualities of the dose of pasta.

SUBJECT-MATTER OF THE INVENTION

The object of the invention is to provide a machine that can reduce the drawbacks of the prior art.

According to the invention, there is provided a machine for cooking a dose of pasta in a container having a top opening, the machine comprising:
- a frame comprising an upper structure and a lower structure facing the upper structure;
- a dispenser, which comprises at least a first opening for delivering steam and at least a second opening for delivering hot water, is supported by the upper structure and extends from the upper structure towards the lower structure in the space between the upper structure and the lower structure along a longitudinal axis;
- a reference element, which is supported by the lower structure and is configured to place the top opening of the container in correspondence of the dispenser.

Thanks to the present invention, a dose of pasta can be cooked in a container placed under the dispenser by delivering steam and hot water separately or simultaneously and/or according to any sequence, so as to optimize the cooking times and quality.

Furthermore, the reference element allows the container to be placed in a predetermined position relative to the dispenser in a simple, quick and repeatable manner. The relative position between the dispenser and the container allows for a better and more uniform distribution of steam and hot water in the container, with the advantage of obtaining a homogeneous cooking of the dose of pasta.

Taking into account the very short cooking time, the uniform distribution of steam and hot water is extremely important for obtaining a homogeneous cooking.

In particular, the lower structure comprises a supporting wall configured to support the container, said reference element being fixed to the supporting wall.

In this way, the container can be placed in the predetermined position on the supporting wall under the dispenser.

In particular, the supporting wall is movable along the longitudinal axis.

In this way, it is possible to change the relative distance, measured along the longitudinal axis, between the dispenser and the supporting wall.

Since the dispenser projects downwards, the insertion of the container in the cooking position entails pushing the supporting wall downwards so as not to interfere with the dispenser.

More in detail, the lower structure comprises a guide device to move the supporting wall along the longitudinal axis and at least one elastic element configured to push the supporting wall towards the dispenser.

In this way, the distance of the container from the dispenser can be controlled in a mechanical manner.

In particular, the force directed along the longitudinal axis in the direction of the dispenser, which is exerted upon the supporting wall by the at least one elastic element, increases as the distance, measured along the longitudinal axis, between the dispenser and the supporting wall increases.

In particular, the dispenser is shaped so as to define a lid for the container.

In this way, the dispenser also serves as a lid, so that the relative positioning between the dispenser and the container allows for the definition of a closed compartment, into which hot water and steam are introduced and which is kept at a light overpressure relative to the ambient pressure on the outside of the container.

When the pressure of the steam in the closed compartment becomes too high, the container and the supporting surface are slightly lowered so as to allow for the release of the excess steam, thus reducing the pressure in the closed compartment.

In particular, the dispenser comprises an external edge folded towards the lower structure.

In this way, there is an increase in the seal of the closed compartment defined by the relative positioning between the dispenser and the container.

In particular, the frame comprises a basement supporting the lower structure; and a vertical structure extending from the basement and supporting the upper structure.

In this way, the machine is sturdy.

In particular, the machine comprises a boiler, which is arranged within the frame on the opposite side of the vertical structure relative to the upper structure and the lower structure.

In this way, the dimensions of the bulk volume of the machine are reduced.

In particular, the machine comprises a steam distribution pipe in fluidic communication with the at least first opening and a hot water distribution pipe in fluidic communication with the at least second opening.

In this way, steam and hot water can be introduced into the container in an independent manner.

In particular, the machine comprises a display and interface panel supported by the upper structure.

In this way, a human operator can display and manually set the cooking parameters, which comprise, for example, the time interval during which the introduction of hot water or steam into the container takes place and the sequence of introduction of hot water and steam into the container.

Another object of the present invention is to provide a system for cooking a dose of pasta in a container, the system comprising:

a machine as described above; and a container with a top opening.

Thanks to the system, hot water and steam can separately and independently be introduced into the container containing a dose of pasta.

In particular, the container comprises a base wall, a lateral wall and the top opening opposite the base wall and delimited by an edge; wherein the maximum distance between two points belonging to the lateral wall is greater than the distance between the base wall and the edge of the opening, in particular the maximum distance between two points belonging to the lateral wall is greater than twice the distance between the base wall and the edge of the opening.

In this way, the hot water and the steam delivered inside the container can be distributed in a uniform manner.

More in detail, the dose of pasta contained inside the container can be wetted with hot water in a homogeneous and widespread manner so as to facilitate the cooking of the dose of pasta.

In particular, the system comprises a plurality of containers made of waterproofed cardboard.

In this way, the dose of pasta can be eaten from the same disposable container in which it was cooked.

In particular, the system comprises a plurality of packages, each of which is configured to store and transport the dose of pasta and comprises a container; a dose of pasta; and at least one protective foil to hermetically seal the dose of pasta in the container.

In this way, the operation of dosing the dose of pasta before the cooking can be avoided, with a consequent saving in terms of time.

In particular, the container of the package is configured to be used for cooking the dose of pasta and for consuming the dose of pasta.

In this way, the dose of pasta can be cooked and eaten using the same container, with no need to transfer the dose of pasta to another container after the cooking.

BRIEF DESCRIPTION OF THE DRAWINGS

Further features and advantages of the present invention will be apparent from the following description of a non-limiting embodiment thereof, with reference to the attached figures, wherein.

PREFERRED EMBODIMENT OF THE INVENTION

Figure 1:
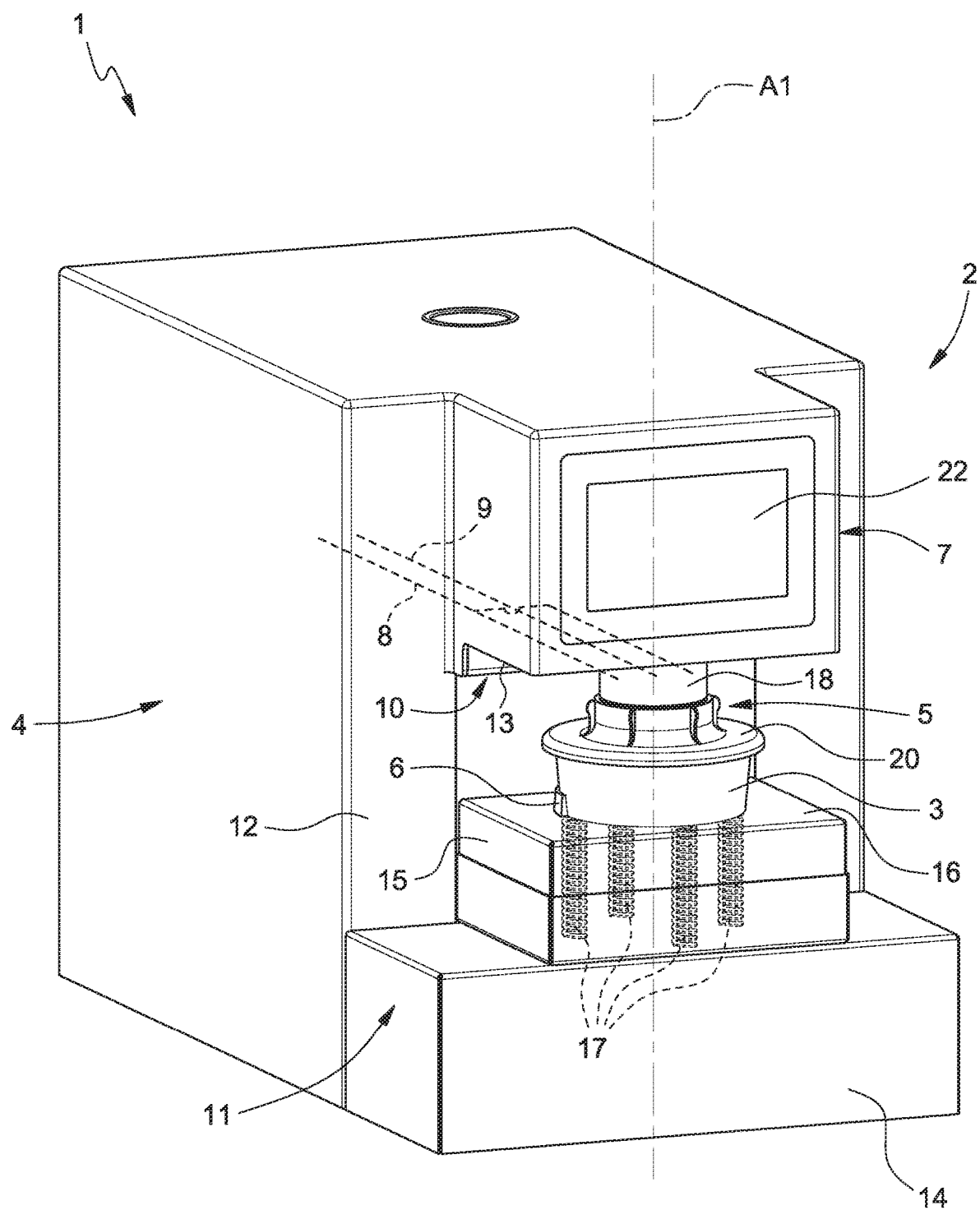
FIG. 1 is a perspective view, with parts removed for clarity and schematic parts, of a system for cooking a dose of pasta according to the present invention.
Figure 4:
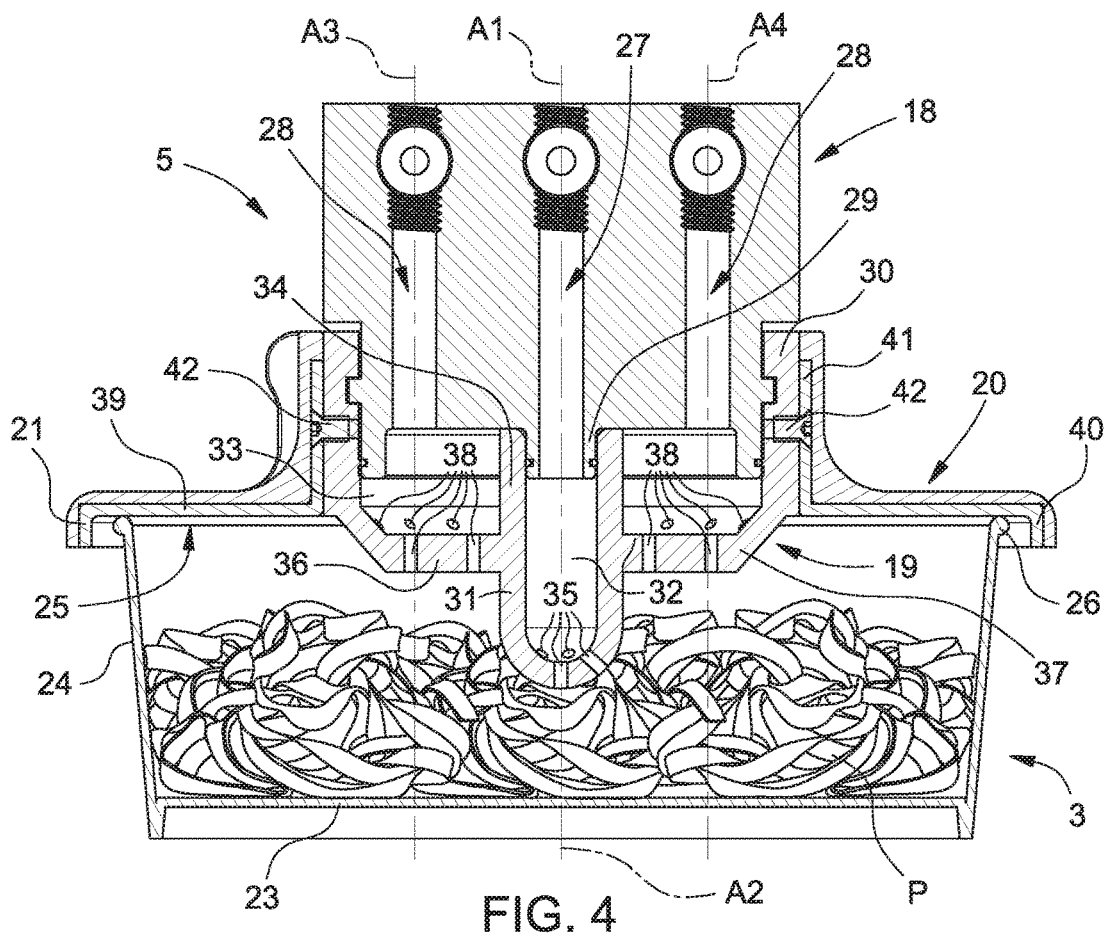
FIG. 4 is a section view, with parts removed for clarity, of a dispenser and of a container of the system of FIG. 1 in an operating configuration.

With reference to FIG. 1, number 1 indicates, as a whole, a system for cooking a dose of pasta P (FIG. 4).

The system 1 comprises a machine 2 for cooking a dose of pasta P and a container 3 configured to contain the dose of pasta P (FIG. 4).

With reference to FIG. 4, the dose of pasta P comprises a plurality of unitary pasta elements placed inside the container 3 in such a way that there are spaces between the unitary elements.

With reference to FIG. 1, the machine 2 comprises a frame 4, a dispenser 5, a reference element 6, a display and interface panel 7, a hot water distribution pipe 8 and a steam distribution pipe 9.

The frame 4 comprises an upper structure 10, a lower structure 11 facing the upper structure 10 and a vertical structure 12, which extends from the lower structure 11 and supports the upper structure 10.

In the example shown in FIG. 1, the upper structure 10 comprises a lower wall 13, from which the dispenser 5 projects. The lower structure 11 comprises a basement 14, which supports a guide device 15 and a supporting wall 16, which is configured to define a bearing and supporting surface for the container 3 under the dispenser 5.

In particular, the supporting wall 16 is elastically supported so as to allow the supporting wall 16 to translate in a vertical manner. More in detail, the guide device 15 comprises two bodies, which are coupled in a prismatic manner, and at least one elastic element 17, which pushes the supporting wall 16 upwards. A stroke stop can be provided, which is not shown in the attached figures and fulfills the function of limiting the upper height of the supporting wall 16. In the absence of a stroke stop, the upper height is defined by the elastic element 17.

In the example shown in FIG. 1, a plurality of elastic elements 17 are shown.

The hot water distribution pipe 8 and the steam distribution pipe 9 are hydraulically connected to the dispenser 5, which extends along a longitudinal axis A1 from the supporting wall 16 towards the lower wall 13 in the space comprised between the upper structure 10 and the lower structure 11.

In particular, the dispenser 5 comprises a fixed body 18, which is integral to the machine 2; a nozzle body 19 (FIGS. 4 and 5); and a lid 20, which comprises an outer edge 21 folded towards the lower structure 11 and is configured to delimit, together with the nozzle body 19 and the container 3, a closed compartment, into which hot water and steam are introduced.

The reference element 6 is integral to the supporting wall 16 and is shaped so as to follow the lateral profile of the container 3, so as to determine a predefined position for the container 3 on the supporting wall 16 and relative to the dispenser 5.

The display and interface panel 7 is supported by the upper structure 10 and comprises a touch screen 22 on which a human operator can display and manually set the cooking parameters, which comprise, for example, the time interval during which the introduction of hot water or steam into the container 3 takes place and the sequence of introduction of hot water and steam into the container 3.

Figure 2:
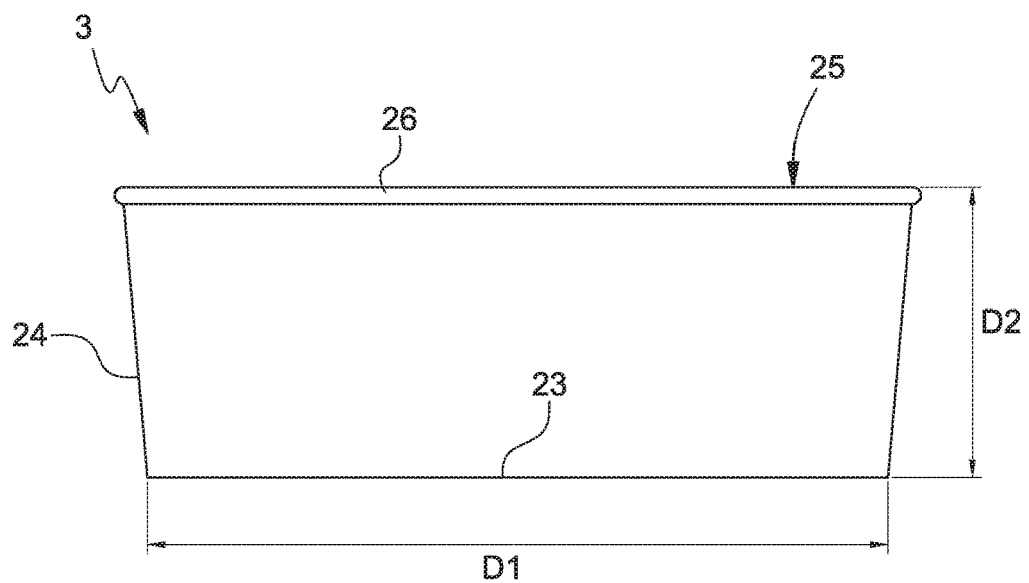
FIG. 2 is a side elevation view of a container of the system for cooking a dose of pasta of FIG. 1.

With reference to FIG. 2, the container 3 comprises a base wall 23, a lateral wall 24 and a top opening 25, which is opposite to the base wall 23 and is delimited by an edge 26; wherein the maximum distance D1 between two points belonging to the lateral wall 24 along the base wall 23 is greater than the distance D2 between the base wall 23 and the edge 26 of the top opening 25.

In particular, the maximum distance D1 between two points of the lateral wall 24 along the base wall 23 is greater than twice the distance D2 between the base wall 23 and the edge 26 of the top opening 25.

In other words, the container 3 has a horizontal dimension which is greater than twice its height.

In the example shown in FIG. 2, the container 3 has a base wall 23 with a circular shape and a slightly flared lateral wall 24. In this configuration, the diameter of the base wall 23 is greater than twice the distance between the base wall 23 and the edge 26 of the top opening 25.

Figure 3:
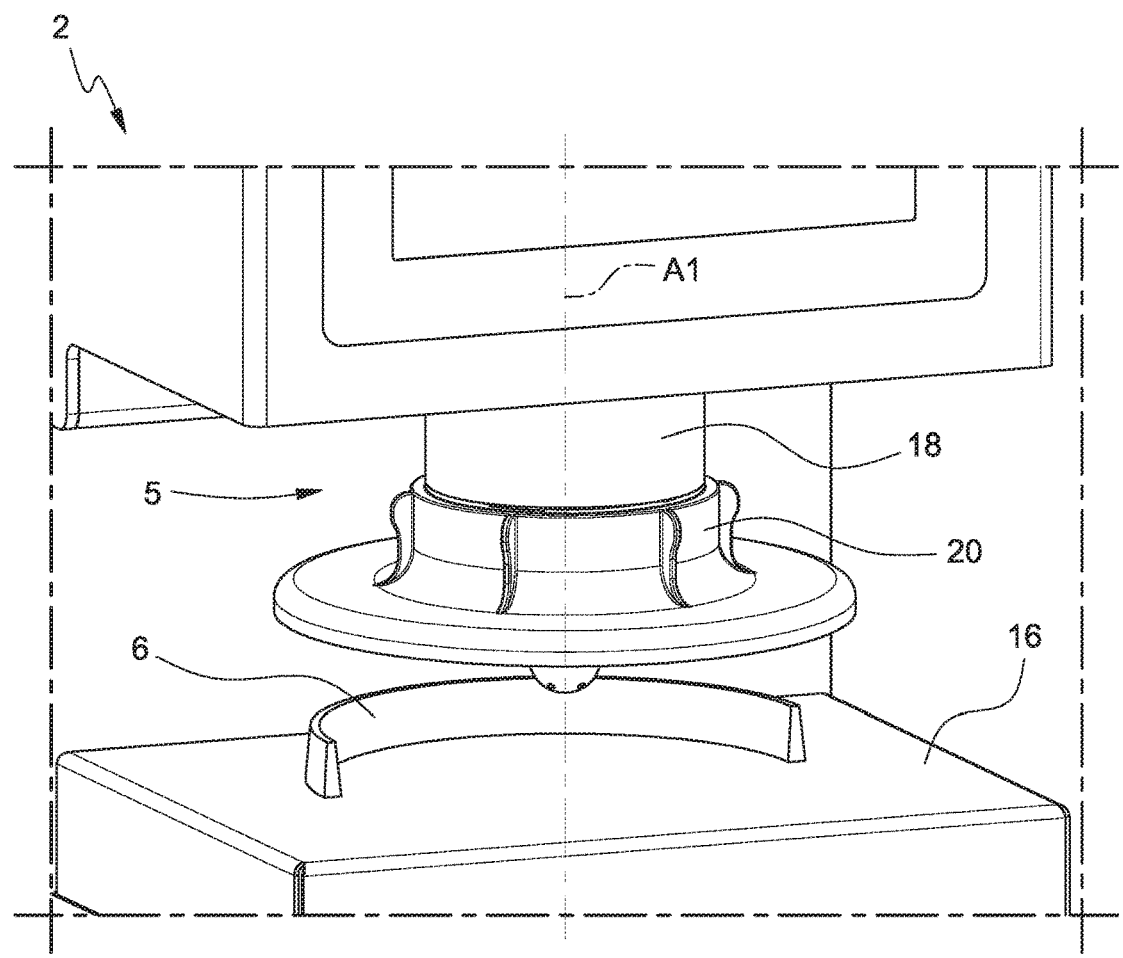
FIG. 3 is a perspective view of a detail of a machine of the system for cooking a dose of pasta of FIG. 1.

With reference to FIG. 3, the reference element 6 is configured to keep the top opening 25 of the container 3 in correspondence of the dispenser 5 and in a predetermined position.

In particular, the reference element 6 develops along a half-circumference and is configured to keep the center of the base wall 23 of the container 3 aligned with the longitudinal axis A1.

In other words, the longitudinal axis A1 goes through the center of said half-circumference.

With reference to FIG. 4, the fixed body 18 has a steam supply channel 27, which extends along an axis A2 substantially coinciding with the longitudinal axis A1, and two hot water supply channels 28, which extend along two respective axes A3 and A4, which are substantially parallel to the longitudinal axis A1 and are equally spaced apart from the axis A2.

The fixed body 18 has an appendage 29 comprising a cylindrical wall, which is configured to be coupled to the nozzle body 19 and to delimit the end part of the steam supply channel 27.

The steam supply channel 27 is hydraulically connected to the steam distribution pipe 9 and the hot water supply channels 28 are hydraulically connected to the hot water distribution pipe 8.

The nozzle body 19 develops around the longitudinal axis A1 and comprises a cylindrical wall 30, which is shaped so as to be coupled to the fixed body 18 in a removable manner by means of a bayonet coupling.

The nozzle body 19 comprises a central protrusion 31, which extends along the longitudinal axis A1.

The fixed body 18 and the nozzle body 19 are coupled so as to form a central chamber 32, which is in fluidic communication with the steam supply channel 27, and a chamber 33 arranged around the chamber 32, which is in fluidic communication with the two hot water supply channels 28.

In particular, the nozzle body 19 comprises an inner cylindrical wall 34 arranged around the appendage 29, which is an extension of the central protrusion 31, is coupled to the appendage 29 and separates the chamber 32 from the chamber 33 in a hydraulically sealed manner.

The nozzle body 19 comprises a plurality of openings 35 for feeding steam into the container 3, which are distributed along the central protrusion 31 and extend along respective axes.

In particular, at least one opening 35 arranged along the longitudinal axis A1 and in correspondence of the lower end of the central protrusion 31 extends along a respective axis, which is parallel to the longitudinal axis A1, whereas the remaining openings 35 extend around the longitudinal axis A1 along respective axes, which are inclined relative to the longitudinal axis A1.

The plurality of openings 35 hydraulically connect the chamber 32 and the container 3.

Steam is introduced into the container 3 at a pressure greater than the ambient pressure on the outside. More in detail, according to a preferred embodiment non-limiting the present invention, the pressure of the steam introduced into the container 3 is comprised between 1.1 bar and 3 bar, preferably between 1.1 bar and 1.5 bar.

Furthermore, the nozzle body 19 comprises a wall 36 and a wall 37, which extend around the central protrusion 31 and have a plurality of openings 38 for feeding hot water into the container 3.

In particular, some openings 38 extend along respective axes parallel to the longitudinal axis A1 and the other openings 38 extend along respective axes inclined with respect to the longitudinal axis A1.

The plurality of openings 38 hydraulically connect the chamber 33 and the container 3.

Hot water is introduced into the container 3 at a temperature exceeding 50° C. More in detail, according to a preferred embodiment non-limiting the present invention, the temperature of the hot water introduced into the container 3 is comprised between 94° C. and 100° C., preferably between 96° C. and 98° C.

The free end of the central protrusion 31, which is provided with openings 35, is arranged under the level occupied by the dose of pasta.

The lid 20 is arranged around the nozzle body 19 and is configured to close the container 3. In other words, the dispenser 5 and the container 3 are coupled so as to form a substantially closed compartment, which contains the dose of pasta P.

In particular, the lid 20 comprises an annular wall 39, which is flat and is configured to be placed in contact with the edge 26 of the container 3; an edge wall 40, which is configured to be placed around the container 3; and a connecting wall 41, which is substantially cylindrical and is configured to be coupled to the nozzle body 19.

Furthermore, the lid 20 is coupled to the nozzle body 19 by means of fixing elements 42 and, therefore, can selectively be removed from the nozzle body 19.

In a variant of the invention, which is not shown in the attached Figures, the lid 20 is fixed to the nozzle body 19 in an integral manner.

Figure 5:
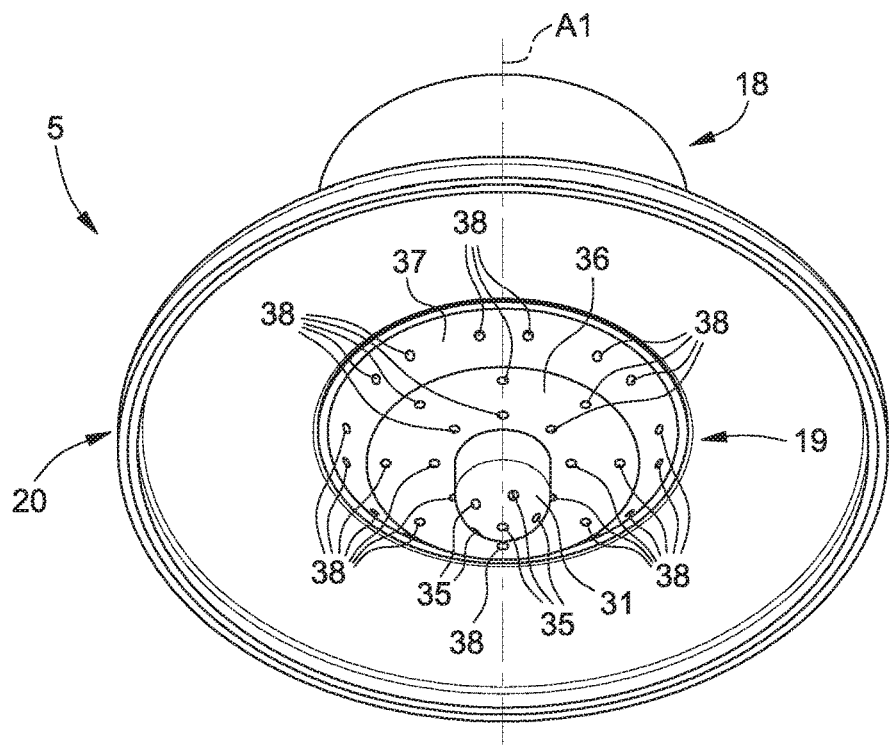
FIG. 5 is a perspective view, with parts removed for clarity, of the dispenser of FIG. 4.

With reference to FIG. 5, the distribution of the openings 35 and 38 of the nozzle body 19 can be clearly seen.

In particular, the openings 35 are distributed around the longitudinal axis A1, in correspondence of the free end of the central protrusion 31.

The openings 38 having an axis that is parallel to the longitudinal axis A1 are arranged around the longitudinal axis A1, along a wall 36 which is adjacent to the central protrusion 31.

The openings 38 having an axis that is inclined with respect to the longitudinal axis A1 are arranged around the longitudinal axis A1, along the inclined wall 37 which is adjacent to the wall 36 and to the cylindrical wall 30.

Figure 6:
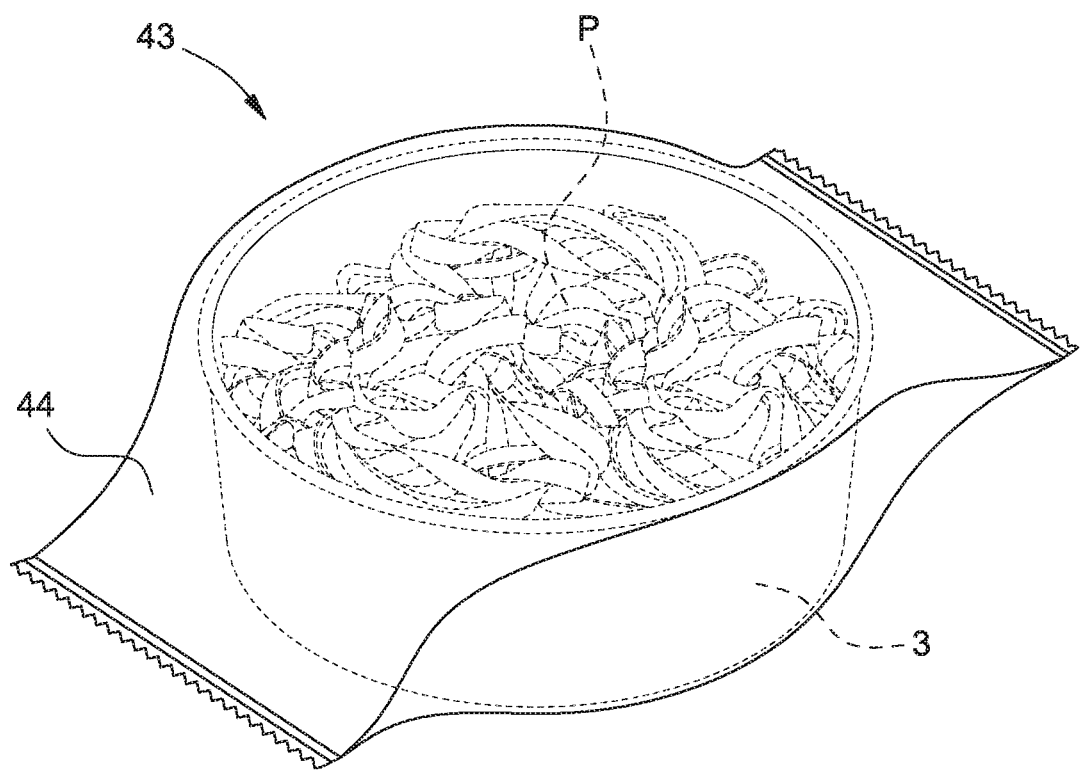
FIG. 6 is a perspective view, with parts removed for clarity, of a package for a dose of pasta according to the system of the present invention.

With reference to FIG. 6, the system 1 comprises a plurality of packages 43, each configured to store and transport a respective dose of pasta and comprising a container 3; a dose of pasta P; and at least one protective foil 44 to hermetically seal the dose of pasta P in the container 3.

In the example shown herein, the protective foil 44 is shaped like a closed bag.

In particular, the container 3 is configured to be used for cooking the dose of pasta P and for eating the dose of pasta P.

In use, the protective foil 44 is removed from a package 43 and the container 3 and the respective dose of pasta P are coupled to the dispenser 5.

With reference to FIG. 1, before steam and/or hot water are delivered by the dispenser 5, the supporting wall 16 is moved apart from the lower wall 13 by applying a little pressure on the supporting wall 16, which determines a temporary shortening of the elastic element 17 and is kept during the positioning of the container 3 under the dispenser 5.

Said positioning is carried out by placing the container 3 on the supporting wall 16 so that a portion of the lateral wall 24 of the container 3 is in contact with the reference element 6.

Subsequent to the positioning of the container 3, the little pressure applied to the supporting wall 16 is released, thus determining the lengthening of the elastic element 17, which pushes the container 3 resting on the supporting wall 16 against the dispenser 5.

In particular, the edge 26 of the container 3 is pushed against the lid 20, determining the closing of the top opening 25 of the container 3.

The introduction of steam into the container 3 determines an overpressure inside the container 3, which is mechanically controlled and limited thanks to the supporting wall 16, which is supported by the elastic element 17 and can slide thanks to the guide device 15.

In detail, the force that tends to move the supporting wall 16 away from the lower wall 13, which is exerted upon the lid 20, upon the nozzle body 19 and upon the base wall 23, is balanced by the force directed towards the lower wall 13, which is exerted by the elastic element 17 upon the supporting wall 16.

In particular, as the pressure on the inside of the container 3 increases, the force exerted upon the base wall 23, upon the lid 20 and upon the nozzle body 19 increases. This force tends to increase the distance between the lower wall 13 and the supporting wall 16, thus creating, between the edge 26 of the container 3 and the lid 20, a slit, from which steam at an overpressure with respect to the outside environment escapes, reducing the value of the pressure inside the container 3.

As the value of the pressure inside the container 3 decreases, the force directed towards the lower wall 13, which is exerted by the elastic element 17 upon the supporting wall 16, tends to close said slit, thus restoring the contact between the edge 26 of the container 3 and the lid 20.

In particular and with reference to FIG. 4, the relative positioning between the container 3 and the dispenser 5, the delivery of steam from the plurality of openings 35 into the dose of pasta P contained in the container 3 and the delivery of hot water from the plurality of openings 38 above the dose of pasta P contained inside the container 3 allow for a homogeneous diffusion of hot water and of steam in the dose of pasta P.

Once the dose of pasta P is cooked, the container 3 is removed from the machine 2 and the dose of pasta P can be eaten in the same container 3.

It is apparent that variations can be made to the present invention without departing from the scope of protection of the appended claims.

The invention claimed is:

1. A machine for cooking a dose of pasta in a container, the machine comprising:
    a frame comprising an upper structure and a lower structure facing the upper structure; and
    a dispenser, which comprises at least a first opening for delivering steam and at least a second opening for delivering hot water, is supported by the upper structure, and extends from the upper structure towards the lower structure in the space between the upper structure and the lower structure along a longitudinal axis, the dispenser further comprising:
        a fixed body, which is integral to the machine;
        a nozzle body comprising a central protrusion, which extends along the longitudinal axis; and
        a lid, which comprises an outer edge folded towards the lower structure and is configured to delimit, together with the nozzle body and the container, a closed compartment, into which hot water and steam are introduced,
        wherein the nozzle body comprises a first wall and a second wall, which extend around the central protrusion and have a plurality of second openings for feeding hot water into the container.

2. The machine as claimed in claim 1, and comprising a reference element, which is supported by the lower structure and is configured to place the container with the top opening in correspondence of the dispenser.

3. The machine as claimed in claim 2, wherein the lower structure comprises a supporting wall configured to support the container; the said reference element being fixed to the supporting wall.

4. The machine as claimed in claim 3, wherein the supporting wall is moveable along the longitudinal axis.

5. The machine as claimed in claim 4, wherein the lower structure comprises a guide device to move the supporting wall along the longitudinal axis and at least one elastic element configured to push the supporting wall towards the dispenser.

6. The machine as claimed in claim 1, wherein the dispenser is shaped so as to define a lid for the container.

7. The machine as claimed in claim 6, wherein the dispenser comprises an external edge folded towards the lower structure.

8. The machine as claimed in claim 1, wherein the frame comprises a basement supporting the lower structure; and a vertical structure extending from the basement and supporting the upper structure.

9. The machine as claimed in claim 8, and comprising a boiler which is arranged within the frame by the opposite band of the vertical structure with respect to the upper structure and the lower structure.

10. The machine as claimed in claim 1, and comprising a steam distribution pipe in fluidic communication with the at least first opening, and a hot water distribution pipe in fluidic communication with the at least second opening.

11. The machine as claimed in claim 1, and comprising a display and interface panel supported by the upper structure.

12. A system for cooking a dose of pasta in a container, the system comprising:
    a machine as claimed in claim 1; and
    a container with a top opening.

13. The system as claimed in claim 12, wherein the container comprises a base wall, a lateral wall and the top opening opposite to the base wall and bounded by an edge; wherein the maximum distance between two points belonging to the lateral wall is greater than the distance between the base wall and the edge of the top opening, in particular the maximum distance between two points belonging to the lateral wall is greater than twice the distance between the base wall and the edge of the top opening.

14. The system as claimed in claim 12, and comprising a plurality of containers made of waterproofed cardboard.

15. The system as claimed in claim 12, and comprising a plurality of packages each of which is configured to store and transport the dose of pasta and comprises a container; a dose of pasta; and at least one protective foil to hermetically seal the dose of pasta in the container.

16. The system as claimed in claim 15, wherein the container of the package is configured to be used for cooking the dose of pasta and for consuming the dose of pasta.

* * * * *